United States Patent Office 2,789,964
Patented Apr. 23, 1957

2,789,964

POLYCARBONATES FROM 1,4-BIS-(β-HYDROXY-ETHOXY)-BENZENE-BIS-(ALKYL OR ARYL CARBONATES)

Delbert D. Reynolds and John Van Den Berghe, Rochester, N. Y., assignors to Eastman Kodak Company, Rochester, N. Y., a corporation of New Jersey No Drawing. Application December 8, 1953,
Serial No. 397,039

10 Claims. (Cl. 260—47)

This invention relates to highly polymeric linear polycarbonates prepared by the self-condensation in the presence of an ester-interchange catalyst of a 1,4-bis-(β-hydroxyethoxy)-benzene-bis-(alkyl or aryl carbonate) or substituted derivative thereof wherein a hydrogen atom is replaced by a lower alkyl radical.

These starting materials are hereinafter referred to as bis-(carbonate) monomers.

This invention also includes highly polymeric linear polycarbonates prepared by condensing mixtures of the bis-(carbonate) monomers defined above.

This invention furthermore relates to a process for preparing these highly polymeric linear polycarbonates by the self-condensation of a bis-(carbonate) monomer, said process being characterized by an ester-interchange reaction whereby an alkyl or an aryl carbonate is removed by vaporization.

It is an object of this invention to provide unexpectedly superior highly polymeric linear polycarbonates which are valuable molding resins and have other valuable properties as described herein. An additional object of this invention is to provide a process for the preparation of these polycarbonates. Moreover, another object is to provide the bis-(carbonate) monomers as new compounds, as well as providing a process for their preparation. Other objects will become apparent hereinafter.

Linear polycarbonates prepared by the condensation of p-xylylene glycol with an alkyl carbonate have been described by Carothers and his followers in a few patents and in Carothers collected papers. Practically no subsequent work appears to have been performed in connection with the preparation of related polyesters. According to Carothers, all of the polycarbonates described were prepared by alcoholysis between a glycol and ethyl carbonate in the presence of an alkaline catalyst such as sodium whereby vapors of an alcohol were driven off by heating. One of Carothers' followers suggests that a trace of an aliphatic dibasic acid can be introduced into the reactants in Carothers' process whereby "superpolycarbonates" can be produced by heating under a vacuum. In contrast, the process of the instant invention is simple, direct, easily reproducible, and the polycarbonates obtainable are valuable resinous products having high intrinsic viscosity.

We have therefore discovered polycarbonates which upon initial examination might appear somewhat related to those previously described but upon more careful examination are found to be entirely new and distinct.

Although the somewhat analogous polycarbonates, e. g. those derived from 4,4'-bis-(β-hydroxyethoxy)-biphenyl-bis-(ethyl carbonate), which are described in copending application Serial No. 397,040 filed on even date herewith, are crystalline polymers having melting points of about 210° C., or higher, nevertheless, the polymers of the instant application are, quite surprisingly, useful as lower melting, non-crystalline, tough resinous materials having especially valuable properties as molding compositions or as ingredients in resinous molding materials.

The process of this invention for producing the novel polycarbonates comprises (A) self-condensing a bis-(carbonate) monomer having the following formula:

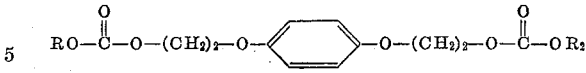

wherein $R_1$ and $R_2$ each represents a radical selected from the class consisting of lower alkyl radicals containing from 1 to 4 carbon atoms and aryl radicals of the benzene series containing from 6 to 8 carbon atoms, (B) in the presence of an ester interchange catalyst as a condensing agent, (C) at an elevated temperature, (D) the condensation being conducted in an inert atmosphere, and (E) the latter part of the condensation being conducted at a very low pressure.

It can readily be seen from the description of this process that there is no problem involved in adjusting the ratio of carbonate constituents to the 1,4-bis(β-hydroxyethoxy)-benzene constituents in the reaction vessel since the polycarbonates are produced according to this invention by the self-condensation of only one starting material. This establishes the composition of the polycarbonate produced since there can be no variation in the proportion of carbonate and dihydroxy compound constituents. Moreover, the nature of this process makes it admirably suited to conducting the process on a continuous basis since no problems are involved in maintaining critical proportions of reactants.

Examples of the starting materials, i. e. the bis-(carbonate) monomers which can be used in the process of this invention include 1,4-bis-(β-hydroxyethoxy)-benzene-bis-(ethyl carbonate), 1,4-bis-(β-hydroxyethoxy)-benzene-bis-(p-tolyl carbonate), 1,4-bis-(β-hydroxyethoxy)-benzene - bis - (phenyl carbonate), 1,4 - bis - (β-hydroxyethoxy)-benzene-bis-(n-butyl carbonate), 1,4-bis-(β-hydroxyethoxy)-benzene-bis-(isopropyl carbonate), etc.

In carrying out the process of this invention the ester-interchange catalysts which can be employed as condensing agents include the following compounds: alkali metals, the alkaline earth metals, the oxides of these two groups of metals, the alkoxides containing from 1 to 8 carbon atoms of these two metals, the carbonates and borates of these two metals, lead oxide, compounds of germanium, antimony, cobalt and other metals including compounds having the following formulas:

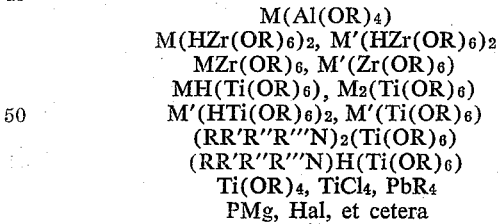

wherein M represents an alkali metal, M' represents an alkaline earth metal selected from the group consisting of magnesium, calcium and strontium, R represents an alkyl group containing from 1 to 6 carbon atoms, R', R" and R'" each represents a member of the group consisting of R and an aryl group of the benzene series containing from 6 to 9 carbon atoms and Hal represents a halogen atom.

The ester interchange catalytic condensing agents which have been described above can be advantageously employed in an amount of from 0.005% to about 0.2% by weight of these catalysts based upon the weight of the starting material being condensed. Higher or lower percentages can also be employed. Generally, from about 0.01% to about 0.1% of at least one of these ester-interchange catalysts is particularly advantageous. Many of these ester-interchange catalytic condensing agents are described in the prior art relating to the preparation of polyesters. There are numerous literature and patent references describing such catalysts. Some of the valuable ester-interchange catalytic condensing agents are described in a series of copending applications filed on October 3, 1952 by one or more of Caldwell, Wellman, and Reynolds, Serial No. 313,072, Patent No. 2,720,502; Serial No. 313,073, Patent No. 2,720,503; Serial No. 313,074, Patent No. 2,720,504; Serial No. 313,075, Patent No. 2,727,881; Serial No. 313,076, Patent No. 2,720,505; Serial No. 313,077, Patent No. 2,720,506; Serial No. 313,078, Patent No. 2,720,507.

The temperatures at which the condensation can be conducted are advantageously increased during the course of the condensation. Advantageously, the condensation reaction can be considered as being conducted in two stages. The temperature to which the condensation reaction mixture is initially raised at the beginning of the first stage is advantageously in excess of about 200° C. Lower temperatures can also be effectively employed. It is convenient to consider the condensation process as being conducted in two separate stages although the actual condensation itself continues smoothly from the first stage into the second stage. The principal distinction between the so-called two stages lies in the fact that during the latter stage the pressure of the adjacent atmosphere under which the condensation is performed is greatly reduced. Although the temperature can remain the same for both the first and the second stage, it may be advantageous to employ a somewhat higher temperature at about the same time as the pressure is reduced. Temperatures employed during the latter part of the second stage can advantageously be as high as 240°–250° C. or higher, with the maximum temperature being determined by the tendency of the polycarbonate to decompose at extremely high temperatures.

The reduced pressure which is employed during the second stage of the condensation is advantageously less than about 15 mm. of Hg pressure. Most advantageously the pressure is less than about 0.5 mm. of Hg pressure. Generally speaking, pressures are employed which are the lowest pressures obtainable by the employment of an efficient high vacuum mechanical pump. Such pressures generally are in the range of less than 1 mm. of Hg pressure.

The inert atmospheres which can be advantageously employed in the course of the condensation reaction include atmospheres of nitrogen, hydrogen, helium, carbon dioxide, etc.

It is generally advantageous to stir the condensing reaction mixture in order to maintain a reasonably even distribution of temperature throughout the reaction mixture and to otherwise facilitate the condensation. However, this is not essential especially when small quantities of bis-(carbonate) monomers are being condensed. During the course of the reaction an alkyl or an aryl carbonic acid ester will be evolved as a gas as indicated hereinabove. Stirring facilitates the removal of this material in its gaseous form. Either as an aid to the stirring operation or in lieu thereof, the inert gas can be advantageously bubbled through the reaction mixture whereby the removal of the carbonic acid ester is facilitated.

The products of this invention are highly polymeric polycarbonates having high intrinsic viscosities, which are composed of the following repeating units:

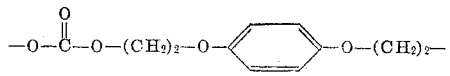

wherein the units are connected by ester linkages. In this specification all intrinsic viscosities are measured by standard procedures employing solutions in 60% phenol-40% sym. tetrachloroethane.

The various conditions described somewhat generally hereinabove can obviously be varied considerably to suit the particular starting material being condensed, the catalyst employed, etc. The preparation of interpolycarbonates is described in copending applications, i. e. Serial No. 407,804, Serial No. 407,805, and Serial No. 407,806 filed on February 2, 1954. Besides employing bis-(carbonate) monomers in the formation of interpolycarbonates, the polycarbonates of this invention can be mechanically admixed in their other polycarbonates to form mixed polymers possessing average properties derived from the various components of the mixture. It is similarly obvious that both the unmodified polycarbonates and the interpolycarbonates can be suitably blended or mixed with other high polymers such as polyesters, polyurethanes, polyamides, polystyrene, polyethylene, etc., insofar as the polycarbonates of this invention are compatible with such high polymers. The products which can be produced include waxes, fibers, films, sheets, molded articles, extrusion products, etc.

As regards continuous processes for carrying out the preparation of the polycarbonates of this invention, it is obvious that many types of apparatus known to be useful in conducting various related continuous processes could be adapted for the preparation of these polycarbonates, e. g. the method disclosed in U. S. 2,647,885 could be suitably adapted.

The bis-(carbonate) monomers employed in accordance with this invention can be prepared as described below. This process is essentially a condensation of 1,4-bis-(β-hydroxyethoxy)-benzene with ethyl chlorocarbonate in the presence of pyridine.

PREPARATION OF 1,4-BIS (β-HYDROXYETHOXY)-BENZENE-BIS-(ETHYL CARBONATE)

A. *1,4-bis-(β-hydroxyethoxy)-benzene*

Hydroquinone (550 g.) was dissolved in 2 liters of water which contained 412 g. of sodium hydroxide. The solution was stirred mechanically and 800 g. ethylene chlorohydrin was added over a 2-hour period. The reaction was exothermic and no external heating was necessary. The mixture was allowed to stand for 16 hours. The resulting crystalline product was slurried in water, filtered and dried. It was then dissolved in 2.5 liters of ethanol, warmed with decolorizing charcoal, and filtered. Ether was added to the warm filtrate until it became cloudy. Upon cooling, the crystalline product separated. Yield 670 g. M. P. 105–107° C.

B. *1,4 - bis - (β - hydroxyethoxy) - benzene - bis - (ethyl carbonate)*

One hundred and ninety-eight grams of 1,4-bis(β-hydroxyethoxy) benzene was dissolved in 500 ml. of pyridine. The reaction mixture was cooled in an ice bath while 244 g. of ethyl chlorocarbonate was added with stirring. The stirring was continued for 30 minutes and the reaction mixture allowed to stand for 16 hours. Two liters of crushed ice with water was added and the mixture stirred for 30 minutes. The product which separated was filtered off and crystallized with alcohol. The dried product melted at 112–113° C. First crop, 185 g. of 54%.

This process can be applied to the preparation of any of the bis (carbonate) monomers employed in this invention, e. g. 1,4 - bis - (β - hydroxyethxy)-benzene-bis-(propyl carbonate), 1,4-bis-(β-hydroxyethoxy)-benzene-bis-(phenyl carbonate), etc.

The following examples will serve to further illustrate the preparation of the polymers of our invention.

EXAMPLE 1.—POLYCARBONATE

One hundred grams of 1,4-bis-(β-hydroxyethoxy)-benzene-bis-(ethyl carbonate) was mixed with 1 cc. of sodium hydrogen titanium butoxide solution and heated under an atmosphere of nitrogen in a 225° C. oil bath. This catalyst solution was prepared by dissolving 1 g. of sodium in 99 g. of n-butanol, adding 14.78 g. Ti(OC₄H₉)₄ and diluting to 200 cc. with n-butanol. The diethyl carbonate was removed by distillation through a Vigreux column. After 2.5 hours the reaction flask was equipped with a mechanical stirrer. The flask was evacuated by means of a water pump and the reaction mixture stirred for one hour. The water pump was replaced by a mechanical pump and stirring continued for three hours. During this period the oil bath was maintained at 245–250° C. The polymer became increasingly viscous. Upon cooling the polymer was a transparent light colored product which could be pulverized and employed as a molding resin. It had a softening point of about 100° C.

EXAMPLE 2.—POLYCARBONATE

Two hundred grams of 1,4-bis-($\beta$-hydroxyethoxy)-benzene-bis-(phenyl carbonate) was mixed with 2 cc. of sodium hydrogen zirconium butoxide catalyst solution and heated under an atmosphere of nitrogen in a 260° C. oil bath. This catalyst was prepared analogously to the catalyst described in Example 1; see copending Caldwell and Wellman application 313,074 referred to above. The diphenyl carbonate was removed as in Example 1 through a Vigreux column. After one and one-half hours, the reaction flask was evacuated by means of a water pump and the reaction mixture stirred mechanically for another hour. The water pump was then replaced by a mechanical high vacuum pump. Stirring was continued at 265° C. under vacuum for two hours. After cooling the polymer became a tough, clear, transparent material of excellent color. This polymer was capable of being extruded to form tough products such as sheets, rods, tubes, etc. It could be molded to form objects having useful shapes. This polyester had an intrinsic viscosity of 0.72 in a solution of 60% phenol-40% sym.-tetrachlorethane.

EXAMPLE 3.—POLYCARBONATE

A quantity of 1,4-bis-($\beta$-hydroxyethoxy)-benzene-bis-(ethyl carbonate) was self-condensed in the same manner as described in the preceding examples using $$Ti(OC_4H_9)_4$$

as the catalyst. Stage I was conducted at 240–260° C. for 3.5 hours in a nitrogen atmosphere. Stage II was conducted in the same temperature range for another 3.5 hours under a pressure of 0.2 mm. of Hg. The polycarbonate product was a non-crystalline very light brown polymer having an intrinsic viscosity of 0.65 in 60% phenol-40% tetrachlorethane. This polymer can be cold drawn, especially if warmed somewhat above room temperature.

EXAMPLE 4.—POLYCARBONATE

The procedure of Example 3 was repeated exactly except that LiAl(OC$_2$H$_5$)$_4$ was employed as the catalyst. The polymer obtained was a rubbery product which could be extruded to form rods, tubes, sheets, etc.

The polycarbonates of this invention can be prepared employing other catalysts and other reaction conditions in a manner analogous to that described in the preceding examples within the scope of the ranges and limits set forth hereinbefore.

The unusual nature of this invention is further emphasized by the fact that compounds having the following formulas have also been tried, but without success, in lieu of the bis-(carbonate) monomers of this invention:

(A) 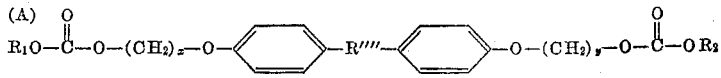

(B) 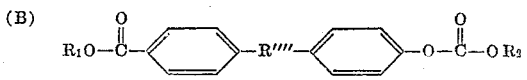

wherein R$_1$ and R$_2$ have been defined above, $x$ and $y$ each represents 1, 2, or 3 and R'''' represents a radical such as —SO$_2$— or —CO— or the like.

In Formula A when $x$ and $y$ are 2, R$_1$ and R$_2$ are ethyl and R'''' is —CO—, the product employing either Ti(OC$_4$H$_9$)$_4$ or LiAl(OC$_2$H$_5$)$_4$ as the catalyst was a non-crystalline, dark brown, porous, unsatisfactory mass. The preparation was accompanied by the evolution of carbon dioxide.

In Formula A when $x$ and $y$ are 2, R$_1$ and R$_2$ are ethyl and R'''' is —SO$_2$—, the product employing either Ti(OC$_4$H$_9$)$_4$ or LiAl(OC$_2$H$_5$)$_4$ as the catalyst was an amber noncrystalline product of relatively low intrinsic viscosity (0.34); although this product was not considered satisfactory due to some decomposition, the polymer could be extruded to form fibers which were capable of being cold drawn.

In Formula B when R$_1$ and R$_2$ are ethyl and R'''' is —SO$_2$—, the product employing Ti(OC$_4$H$_9$)$_4$ as the catalyst was a brown, glassy, noncrystalline, brittle material which was not considered satisfactory for fibers, film, molding compositions, etc. It appeared that some decomposition had occurred.

In Formula B when R$_1$ and R$_2$ are ethyl and R'''' is —CO—, the product employing either Ti(OC$_4$H$_9$)$_4$ or LiAl(OC$_2$H$_5$)$_4$ as the catalyst was a dark, noncrystalline mass which melted only upon heating to about 300° C. with considerable darkening which appeared to be due to some decomposition phenomena.

The products embodying this invention can be prepared either batchwise or continuously, and can be used either alone or admixed with a similar or dissimilar polymeric material or with modifiers or compounding agents such as are used with polymeric material. The products can be used for forming fibers, for molding or extruding, or for forming sheets or films.

We claim:

1. A process for preparing a highly polymeric linear polycarbonate comprising (A) self-condensing a bis-(carbonate) monomer having the following formula:

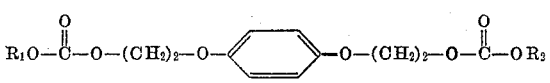

wherein R$_1$ and R$_2$ each represents a radical selected from the group consisting of lower alkyl radicals containing from 1 to 6 carbon atoms and aryl radicals of the benzene series containing from 6 to 8 carbon atoms, (B) in the presence of an ester-interchange catalyst, (C) at an elevated temperature, (D) the condensation being conducted in an inert atmosphere, and (E) the latter part of the condensation being conducted at a very low pressure of the adjacent atmosphere.

2. A process as defined in claim 1 wherein the elevated temperature during the course of the condensation is in excess of about 200° C.

3. A process as defined in claim 2 wherein the ester-interchange catalyst is employed in an amount of from about 0.005% to about 0.2% based on the weight of the bis (carbonate) monomer.

4. A process as defined in claim 3 wherein the low pressure is less than about 15 mm. of Hg pressure.

5. A process as defined in claim 4 wherein the bis (carbonate) monomer is 1,4-bis-($\beta$-hydroxyethoxy)-benzene-bis-(ethyl carbonate).

6. A linear highly polymeric polycarbonate having an intrinsic viscosity of at least 0.7 measured in a solution of 60 volumes of phenol and 40 volumes of tetrachloroethane which is made up of the following repeating units:

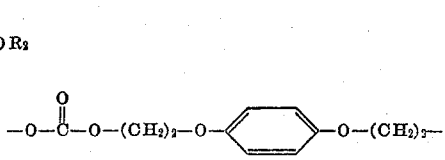

wherein the units are connected by ester linkages and one end of each polymer molecule contains an R$_1$-radical attached to the terminal free oxygen bond and the other end of each polymer molecule contains an —O—CO—O—R$_2$ radical attached to the terminal free methylene bond, wherein R$_1$ and R$_2$ each represents a radical selected from the group consisting of lower alkyl radicals containing from 1 to 6 carbon atoms and aryl radicals of the benzene series containing from 6 to 8 carbon atoms.

7. A process as defined in claim 3 wherein the catalyst is titanium butoxide.

8. A process as defined in claim 3 wherein the catalyst is sodium hydrogen titanium butoxide.

9. A process as defined in claim 3 wherein the catalyst is sodium hydrogen zirconium butoxide.

10. A process defined in claim 3 wherein the catalyst is lithium aluminum ethoxide.

References Cited in the file of this patent

UNITED STATES PATENTS

| 2,210,817 | Peterson | Aug. 6, 1940 |
| 2,379,252 | Muskat | June 26, 1945 |

FOREIGN PATENTS

| 879,250 | France | Nov. 10, 1942 |

OTHER REFERENCES

Carothers: "Collected Papers," High Polymers, vol I, Interscience, New York (1940), pages 31 and 41.